(12) United States Patent
Khare et al.

(10) Patent No.: US 11,979,937 B2
(45) Date of Patent: May 7, 2024

(54) METHOD, APPARATUS AND COMPUTER PROGRAM

(71) Applicant: Nokia Technologies Oy, Espoo (FI)

(72) Inventors: Saurabh Khare, Bangalore (IN); Bruno Landais, Pleumeur-Bodou (FR); Anja Jerichow, Grafing bei München (DE); Laurent Thiebaut, Antony (FR); Georgios Gkellas, Petroupoli (GR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/479,867

(22) Filed: Sep. 20, 2021

(65) Prior Publication Data

US 2023/0099468 A1 Mar. 30, 2023

(51) Int. Cl.
*H04W 8/02* (2009.01)
*H04W 8/18* (2009.01)
*H04W 48/16* (2009.01)
*H04W 84/04* (2009.01)

(52) U.S. Cl.
CPC .............. *H04W 8/02* (2013.01); *H04W 8/18* (2013.01); *H04W 48/16* (2013.01); *H04W 84/042* (2013.01)

(58) Field of Classification Search
CPC ......... H04W 8/02; H04W 8/18; H04W 48/16; H04W 84/042
See application file for complete search history.

(56) References Cited

U.S. PATENT DOCUMENTS

| | | | | |
|---|---|---|---|---|
| 2020/0036754 | A1* | 1/2020 | Livanos | H04W 48/16 |
| 2022/0394453 | A1* | 12/2022 | Goel | H04L 67/562 |
| 2023/0059030 | A1* | 2/2023 | Shao | H04W 12/069 |
| 2023/0080067 | A1* | 3/2023 | Zhu | H04W 12/06 |

OTHER PUBLICATIONS

"3rd Generation Partnership Project; Technical Specification Group Services and System Aspects; Study on enhanced security aspects of the 5G Service Based Architecture (SBA); (Release 17)", 3GPP TR 33.875, V0.3.0, May 2021, pp. 1-28.

(Continued)

*Primary Examiner* — Wayne H Cai
(74) *Attorney, Agent, or Firm* — Nokia Technologies Oy

(57) ABSTRACT

There is provided an apparatus comprising at least one processor and at least one memory including a computer program code, the at least one memory and computer program code configured to, with the at least one processor, cause the apparatus at least to: receive, at a first network repository function in a first network from a security edge protection proxy in a second network, a request for discovering one or more roaming hubs and/or security edge protection proxies in the first network; and send, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

23 Claims, 9 Drawing Sheets

(56) References Cited

OTHER PUBLICATIONS

"3rd Generation Partnership Project; Technical Specification Group Core Network and Terminals; 5G System; Network Function Repository Services; Stage 3 (Release 17)", 3GPP TS 29.510, V17.1.0, Mar. 2021, pp. 1-243.
"3rd Generation Partnership Project; Technical Specification Group Core Network and Terminals; 5G System; Technical Realization of Service Based Architecture; Stage 3 (Release 17)", 3GPP TS 29.500, V17.2.0, Mar. 2021, pp. 1-100.
"3rd Generation Partnership Project; Technical Specification Group Services and System Aspects; System architecture for the 5G System (5GS); Stage 2 (Release 17)", 3GPP TS 23.501, V17.1.1, Jun. 2021, pp. 1-526.
"3rd Generation Partnership Project; Technical Specification Group Services and System Aspects; Security architecture and procedures for 5G system (Release 17)", 3GPP TS 33.501, V17.2.0, Jun. 2021, pp. 1-257.
"3rd Generation Partnership Project; Technical Specification Group Core Network and Terminals; 5G System; Public Land Mobile Network (PLMN) Interconnection; Stage 3 (Release 17)", 3GPP TS 29.573, V17.0.0, Mar. 2021, pp. 1-100.
"LS to 3GPP SA3 working group on 5GS Roaming Hubbing", 3GPP TSG-CT WG4 Meeting #105-e, C4-214739, GSMA NG 5GMRR, Aug. 17-27, 2021, 6 pages.

* cited by examiner

METHOD, APPARATUS AND COMPUTER PROGRAM

FIELD

The present application relates to a method, apparatus, and computer program and in particular but not exclusively to identifying one or more networks that can be reached through a roaming hub or security edge protection proxy.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving 30 and transmitting apparatus for enabling communications, for example enabling access to a communication network or communications directly with other users. The communication device may access a carrier provided by a station, for example a base station of a cell, and transmit and/or receive communications on the carrier.

35 The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: receiving, at a first network repository function in a first network from a security edge protection proxy in a second network, a request for discovering one or more roaming hubs and/or security edge protection proxies in the first network; and sending, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

The means may be for: receiving, at the first network repository function from the one or more roaming hubs and/or security edge protection proxies in the first network, information identifying the said one or more further networks and/or addressing information for contacting the one or more roaming hubs and/or security edge protection proxies in the first network.

The request for information identifying the one or more roaming hubs and/or security edge protection proxies may comprise a subscription request to receive said information and/or be notified about changes of said information.

The means may be for: determining updated information related to roaming hubs and/or security edge protection proxies identifying the one or more further networks which can be reached via a respective roaming hub and/or security edge protection proxy within the first network, and/or updated addressing information for contacting the one or more roaming hubs and/or security edge protection proxies in the first network; and sending, to the security edge protection proxy in the second network, the updated information and/or the updated addressing information.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided an apparatus comprising means for: sending, to a first network repository function in a first network from a security edge protection proxy in a second network, a request for discovering one or more roaming hubs and/or security edge protection proxies within the first network; and receiving, from the first network repository function at the security edge protection proxy in the second network, a response comprising the information identifying the one or more roaming hubs and/or security edge protection proxies within the first network and information identifying one or more remote public land mobile networks which can be reached via a respective roaming hub and/or security edge protection proxy within the first network.

The means may be for: sending, to a second network repository function in the second network, the information identifying the one or more further networks which can be reached via the apparatus and a respective roaming hub and/or security edge protection proxy within the first network, and/or addressing information for contacting one or more roaming hubs and/or security edge protection proxies in the first network.

The request for information identifying the one or more roaming hubs and/or security edge protection proxies may comprise a subscription request.

The means may be for: receiving, at the security edge protection proxy in the second network from the first network repository function, updated information related to a roaming hub and/or security edge protection proxy identifying the one or more further networks which can be reached via a respective roaming hub and/or security edge protection proxy within the first network, and/or updated addressing information for contacting the one or more roaming hubs and/or security edge protection proxies in the first network.

The means may be for: sending, to a second network repository function in the second network, the updated information identifying the one or more further networks which can be reached via a respective roaming hub and/or security edge protection proxy within the first network.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided an apparatus comprising means for: receiving, at a first roaming hub in a first network from a security edge protection proxy or a roaming hub in a second network, a request for information identifying one or more networks reachable via the first roaming hub; and sending, from the first roaming hub in the first network to the security edge protection proxy or roaming hub in the second network, a response comprising information identifying the one or more networks which can be reached via the first roaming hub.

The request and/or the response may comprise a N32-C exchange-capability message.

The means may be for: determining, at the first roaming hub, updated information identifying the one or more networks which can be reached via the first roaming hub; and sending, to the security edge protection proxy in the second network, the updated information.

The means may be for: receiving, from the security edge protection proxy or roaming hub in the second network, a subscription request for updated information identifying the one or more networks which can be reached via the first roaming hub, wherein sending the updated information is performed based on the subscription request.

The updated information may comprise information identifying one or more of: a new network which can be reached via the first roaming hub; a change in information associated with one or more of the one or more networks; and that one of the one or more networks is no longer reachable via the first roaming hub.

The means may be for: receiving, from one or more further roaming hubs in one or more remote networks, information indication one or more further networks that may be reached via the one or more remote roaming hubs; and sending, to the security edge protection proxy in the second network, information identifying the one or more further networks which can be reached via the first roaming hub and the one or more remote roaming hubs.

According to an aspect, there is provided an apparatus comprising means for: sending, to a first roaming hub in a first network, a request for information identifying one or more networks reachable via the first roaming hub; and receiving, from the first roaming hub in the first network, a response comprising information identifying the one or more networks which can be reached via the first roaming hub.

The means may be for: sending, to a network repository function in the second network, the information identifying the one or more networks which can be reached via the apparatus and the first roaming hub within the first network.

The request and/or the response may comprise a N32-C exchange-capability message.

The means may be for: receiving, from the first roaming hub, updated information identifying the one or more networks which can be reached via the first roaming hub; and sending, to the network repository function in the second network, the updated information identifying the one or more networks which can be reached via the first roaming hub.

The means may be for: sending, to the security edge protection proxy or roaming hub in the second network, a subscription request for the updated information, wherein receiving the updated information is based on the subscription request.

The updated information may comprise information identifying one or more of: a new network which can be reached via the first roaming hub; a change in information associated with one or more of the one or more networks; and that one of the one or more networks is no longer reachable via the first roaming hub.

The means may be for: receiving, from the first roaming hub in the first network, information identifying one or more further networks which can be reached via the first roaming hub and one or more further roaming hubs; and sending, to the network repository function in the second network, the information identifying one or more further networks which can be reached by the apparatus via the first roaming hub and the one or more further roaming hubs.

According to an aspect, there is provided an apparatus comprising at least one processor and at least one memory including a computer program code, the at least one memory and computer program code configured to, with the at least one processor, cause the apparatus at least to: receive, at a first network repository function in a first network from a security edge protection proxy in a second network, a request for discovering one or more roaming hubs and/or security edge protection proxies in the first network; and send, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

The at least one memory and at least one processor may be configured to cause the apparatus to: receive, at the first network repository function from the one or more roaming hubs and/or security edge protection proxies in the first network, information identifying the said one or more further networks and/or addressing information for contacting the one or more roaming hubs and/or security edge protection proxies in the first network.

The request for information identifying the one or more roaming hubs and/or security edge protection proxies may comprise a subscription request to receive said information and/or be notified about changes of said information.

The at least one memory and at least one processor may be configured to cause the apparatus to: determine updated information related to roaming hubs and/or security edge protection proxies identifying the one or more further networks which can be reached via a respective roaming hub and/or security edge protection proxy within the first network, and/or updated addressing information for contacting the one or more roaming hubs and/or security edge protection proxies in the first network; and send, to the security edge protection proxy in the second network, the updated information and/or the updated addressing information.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided an apparatus comprising at least one processor and at least one memory including a computer program code, the at least one memory and computer program code configured to, with the at least one processor, cause the apparatus at least to: send, to a first network repository function in a first network from a security edge protection proxy in a second network, a request for discovering one or more roaming hubs and/or security edge protection proxies within the first network; and receive, from the first network repository function at the security edge protection proxy in the second network, a response comprising the information identifying the one or more roaming hubs and/or security edge protection proxies within the first network and information identifying one or more remote public land mobile networks which can be reached via a respective roaming hub and/or security edge protection proxy within the first network.

The at least one memory and at least one processor may be configured to cause the apparatus to: send, to a second network repository function in the second network, the information identifying the one or more further networks which can be reached via the apparatus and a respective roaming hub and/or security edge protection proxy within the first network, and/or addressing information for contacting one or more roaming hubs and/or security edge protection proxies in the first network.

The request for information identifying the one or more roaming hubs and/or security edge protection proxies may comprise a subscription request.

The at least one memory and at least one processor may be configured to cause the apparatus to: receive, at the security edge protection proxy in the second network from the first network repository function, updated information related to a roaming hub and/or security edge protection proxy identifying the one or more further networks which can be reached via a respective roaming hub and/or security edge protection proxy within the first network, and/or updated addressing information for contacting the one or more roaming hubs and/or security edge protection proxies in the first network.

The at least one memory and at least one processor may be configured to cause the apparatus to: send, to a second network repository function in the second network, the updated information identifying the one or more further networks which can be reached via a respective roaming hub and/or security edge protection proxy within the first network.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided an apparatus comprising at least one processor and at least one memory including a computer program code, the at least one memory and computer program code configured to, with the at least one processor, cause the apparatus at least to: receive, at a first roaming hub in a first network from a security edge protection proxy or a roaming hub in a second network, a request for information identifying one or more networks reachable via the first roaming hub; and send, from the first roaming hub in the first network to the security edge protection proxy or roaming hub in the second network, a response comprising information identifying the one or more networks which can be reached via the first roaming hub.

The request and/or the response may comprise a N32-C exchange-capability message.

The at least one memory and at least one processor may be configured to cause the apparatus to: determine, at the first roaming hub, updated information identifying the one or more networks which can be reached via the first roaming hub; and send, to the security edge protection proxy in the second network, the updated information.

The at least one memory and at least one processor may be configured to cause the apparatus to: receive, from the security edge protection proxy or roaming hub in the second network, a subscription request for updated information identifying the one or more networks which can be reached via the first roaming hub, wherein the at least one memory and at least one processor are configured to cause the apparatus to send the updated information in response to receiving the subscription request.

The updated information may comprise information identifying one or more of: a new network which can be reached via the first roaming hub; a change in information associated with one or more of the one or more networks; and that one of the one or more networks is no longer reachable via the first roaming hub.

The at least one memory and at least one processor may be configured to cause the apparatus to: receive, from one or more further roaming hubs in one or more remote networks, information indication one or more further networks that may be reached via the one or more remote roaming hubs; and send, to the security edge protection proxy in the second network, information identifying the one or more further networks which can be reached via the first roaming hub and the one or more remote roaming hubs.

According to an aspect, there is provided an apparatus comprising at least one processor and at least one memory including a computer program code, the at least one memory and computer program code configured to, with the at least one processor, cause the apparatus at least to: send, to a first roaming hub in a first network, a request for information identifying one or more networks reachable via the first roaming hub; and receive, from the first roaming hub in the first network, a response comprising information identifying the one or more networks which can be reached via the first roaming hub.

The at least one memory and at least one processor may be configured to cause the apparatus to: send, to a network repository function in the second network, the information identifying the one or more networks which can be reached via the apparatus and the first roaming hub within the first network.

The request and/or the response may comprise a N32-C exchange-capability message.

The at least one memory and at least one processor may be configured to cause the apparatus to: receive, from the first roaming hub, updated information identifying the one or more networks which can be reached via the first roaming hub; and send, to the network repository function in the second network, the updated information identifying the one or more networks which can be reached via the first roaming hub.

The at least one memory and at least one processor may be configured to cause the apparatus to: send, to the security edge protection proxy or roaming hub in the second network, a subscription request for the updated information, wherein the at least one memory and at least one processor are configured to cause the apparatus to receive the updated information based on the subscription request.

The updated information may comprise information identifying one or more of: a new network which can be reached via the first roaming hub; a change in information associated with one or more of the one or more networks; and that one of the one or more networks is no longer reachable via the first roaming hub.

The at least one memory and at least one processor may be configured to cause the apparatus to: receive, from the first roaming hub in the first network, information identifying one or more further networks which can be reached via the first roaming hub and one or more further roaming hubs; and send, to the network repository function in the second network, the information identifying one or more further networks which can be reached by the apparatus via the first roaming hub and the one or more further roaming hubs.

According to an aspect, there is provided a method comprising: receiving, at a first network repository function in a first network from a security edge protection proxy in a second network, a request for discovering one or more roaming hubs and/or security edge protection proxies in the first network; and sending, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

The method may comprise: receiving, at the first network repository function from the one or more roaming hubs and/or security edge protection proxies in the first network, information identifying the said one or more further networks and/or addressing information for contacting the one or more roaming hubs and/or security edge protection proxies in the first network.

The request for information identifying the one or more roaming hubs and/or security edge protection proxies may comprise a subscription request to receive said information and/or be notified about changes of said information.

The method may comprise: determining updated information related to roaming hubs and/or security edge protection proxies identifying the one or more further networks which can be reached via a respective roaming hub and/or security edge protection proxy within the first network, and/or updated addressing information for contacting the one or more roaming hubs and/or security edge protection proxies in the first network; and sending, to the security edge protection proxy in the second network, the updated information and/or the updated addressing information.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided a method comprising: sending, to a first network repository function in a first network from a security edge protection proxy in a second network, a request for discovering one or more roaming hubs and/or security edge protection proxies within the first network; and receiving, from the first network repository function at the security edge protection proxy in the second network, a response comprising the information identifying the one or more roaming hubs and/or security edge protection proxies within the first network and information identifying one or more remote public land mobile networks which can be reached via a respective roaming hub and/or security edge protection proxy within the first network.

The method may comprise: sending, to a second network repository function in the second network, the information identifying the one or more further networks which can be reached via the apparatus and a respective roaming hub and/or security edge protection proxy within the first network, and/or addressing information for contacting one or more roaming hubs and/or security edge protection proxies in the first network.

The request for information identifying the one or more roaming hubs and/or security edge protection proxies may comprise a subscription request.

The method may comprise: receiving, at the security edge protection proxy in the second network from the first network repository function, updated information related to a roaming hub and/or security edge protection proxy identifying the one or more further networks which can be reached via a respective roaming hub and/or security edge protection proxy within the first network, and/or updated addressing information for contacting the one or more roaming hubs and/or security edge protection proxies in the first network.

The method may comprise: sending, to a second network repository function in the second network, the updated information identifying the one or more further networks which can be reached via a respective roaming hub and/or security edge protection proxy within the first network.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided a method comprising: receiving, at a first roaming hub in a first network from a security edge protection proxy or a roaming hub in a second network, a request for information identifying one or more networks reachable via the first roaming hub; and sending, from the first roaming hub in the first network to the security edge protection proxy or roaming hub in the second network, a response comprising information identifying the one or more networks which can be reached via the first roaming hub.

The request and/or the response may comprise a N32-C exchange-capability message.

The method may comprise: determining, at the first roaming hub, updated information identifying the one or more networks which can be reached via the first roaming hub; and sending, to the security edge protection proxy in the second network, the updated information.

The method may comprise: receiving, from the security edge protection proxy or roaming hub in the second network, a subscription request for updated information identifying the one or more networks which can be reached via the first roaming hub, wherein sending the updated information is performed based on the subscription request.

The updated information may comprise information identifying one or more of: a new network which can be reached via the first roaming hub; a change in information associated with one or more of the one or more networks; and that one of the one or more networks is no longer reachable via the first roaming hub.

The method may comprise: receiving, from one or more further roaming hubs in one or more remote networks, information indication one or more further networks that may be reached via the one or more remote roaming hubs; and sending, to the security edge protection proxy in the second network, information identifying the one or more further networks which can be reached via the first roaming hub and the one or more remote roaming hubs.

According to an aspect, there is provided a method comprising: sending, to a first roaming hub in a first network, a request for information identifying one or more networks reachable via the first roaming hub; and receiving, from the first roaming hub in the first network, a response comprising information identifying the one or more networks which can be reached via the first roaming hub.

The method may comprise: sending, to a network repository function in the second network, the information identifying the one or more networks which can be reached via the apparatus and the first roaming hub within the first network.

The request and/or the response may comprise a N32-C exchange-capability message.

The method may comprise: receiving, from the first roaming hub, updated information identifying the one or more networks which can be reached via the first roaming hub; and sending, to the network repository function in the second network, the updated information identifying the one or more networks which can be reached via the first roaming hub.

The method may comprise: sending, to the security edge protection proxy or roaming hub in the second network, a subscription request for the updated information, wherein receiving the updated information is based on the subscription request.

The updated information may comprise information identifying one or more of: a new network which can be reached via the first roaming hub; a change in information associated with one or more of the one or more networks; and that one of the one or more networks is no longer reachable via the first roaming hub.

The method may comprise: receiving, from the first roaming hub in the first network, information identifying one or more further networks which can be reached via the first roaming hub and one or more further roaming hubs; and sending, to the network repository function in the second network, the information identifying one or more further networks which can be reached by the apparatus via the first roaming hub and the one or more further roaming hubs.

According to an aspect, there is provided a computer readable medium comprising program instructions for causing an apparatus to perform at least the following: receiving, at a first network repository function in a first network from a security edge protection proxy in a second network, a request for discovering one or more roaming hubs and/or security edge protection proxies in the first network; and sending, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

The program instructions may cause the apparatus to perform: receiving, at the first network repository function from the one or more roaming hubs and/or security edge protection proxies in the first network, information identifying the said one or more further networks and/or addressing information for contacting the one or more roaming hubs and/or security edge protection proxies in the first network.

The request for information identifying the one or more roaming hubs and/or security edge protection proxies may comprise a subscription request to receive said information and/or be notified about changes of said information.

The program instructions may cause the apparatus to perform: determining updated information related to roaming hubs and/or security edge protection proxies identifying the one or more further networks which can be reached via a respective roaming hub and/or security edge protection proxy within the first network, and/or updated addressing information for contacting the one or more roaming hubs and/or security edge protection proxies in the first network; and sending, to the security edge protection proxy in the second network, the updated information and/or the updated addressing information.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided a computer readable medium comprising program instructions for causing an apparatus to perform at least the following: sending, to a first network repository function in a first network from a security edge protection proxy in a second network, a request for discovering one or more roaming hubs and/or security edge protection proxies within the first network; and receiving, from the first network repository function at the security edge protection proxy in the second network, a response comprising the information identifying the one or more roaming hubs and/or security edge protection proxies within the first network and information identifying one or more remote public land mobile networks which can be reached via a respective roaming hub and/or security edge protection proxy within the first network.

The program instructions may cause the apparatus to perform: sending, to a second network repository function in the second network, the information identifying the one or more further networks which can be reached via the apparatus and a respective roaming hub and/or security edge protection proxy within the first network, and/or addressing information for contacting one or more roaming hubs and/or security edge protection proxies in the first network.

The request for information identifying the one or more roaming hubs and/or security edge protection proxies may comprise a subscription request.

The program instructions may cause the apparatus to perform: receiving, at the security edge protection proxy in the second network from the first network repository function, updated information related to a roaming hub and/or security edge protection proxy identifying the one or more further networks which can be reached via a respective roaming hub and/or security edge protection proxy within the first network, and/or updated addressing information for contacting the one or more roaming hubs and/or security edge protection proxies in the first network.

The program instructions may cause the apparatus to perform: sending, to a second network repository function in the second network, the updated information identifying the one or more further networks which can be reached via a respective roaming hub and/or security edge protection proxy within the first network.

The information identifying the one or more further networks further may comprise a respective priority parameter associated with the respective roaming hub and/or security edge protection proxy within the first network.

The information identifying the one or more further networks further may comprise information related to new or removed or modified roaming hubs and/or security edge protection proxies.

According to an aspect, there is provided a computer readable medium comprising program instructions for causing an apparatus to perform at least the following: receiving, at a first roaming hub in a first network from a security edge protection proxy or a roaming hub in a second network, a request for information identifying one or more networks reachable via the first roaming hub; and sending, from the first roaming hub in the first network to the security edge protection proxy or roaming hub in the second network, a response comprising information identifying the one or more networks which can be reached via the first roaming hub.

The request and/or the response may comprise a N32-C exchange-capability message.

The program instructions may cause the apparatus to perform: determining, at the first roaming hub, updated information identifying the one or more networks which can be reached via the first roaming hub; and sending, to the security edge protection proxy in the second network, the updated information.

The program instructions may cause the apparatus to perform: receiving, from the security edge protection proxy or roaming hub in the second network, a subscription request for updated information identifying the one or more networks which can be reached via the first roaming hub, wherein sending the updated information is performed based on the subscription request.

The updated information may comprise information identifying one or more of: a new network which can be reached via the first roaming hub; a change in information associated with one or more of the one or more networks; and that one of the one or more networks is no longer reachable via the first roaming hub.

The program instructions may cause the apparatus to perform: receiving, from one or more further roaming hubs in one or more remote networks, information indication one or more further networks that may be reached via the one or more remote roaming hubs; and sending, to the security edge protection proxy in the second network, information identifying the one or more further networks which can be reached via the first roaming hub and the one or more remote roaming hubs.

According to an aspect, there is provided a computer readable medium comprising program instructions for causing an apparatus to perform at least the following: sending, to a first roaming hub in a first network, a request for information identifying one or more networks reachable via the first roaming hub; and receiving, from the first roaming hub in the first network, a response comprising information identifying the one or more networks which can be reached via the first roaming hub.

The program instructions may cause the apparatus to perform: sending, to a network repository function in the second network, the information identifying the one or more networks which can be reached via the apparatus and the first roaming hub within the first network.

The request and/or the response may comprise a N32-C exchange-capability message.

The program instructions may cause the apparatus to perform: receiving, from the first roaming hub, updated information identifying the one or more networks which can be reached via the first roaming hub; and sending, to the network repository function in the second network, the updated information identifying the one or more networks which can be reached via the first roaming hub.

The program instructions may cause the apparatus to perform: sending, to the security edge protection proxy or roaming hub in the second network, a subscription request for the updated information, wherein receiving the updated information is based on the subscription request.

The updated information may comprise information identifying one or more of: a new network which can be reached via the first roaming hub; a change in information associated with one or more of the one or more networks; and that one of the one or more networks is no longer reachable via the first roaming hub.

The program instructions may cause the apparatus to perform: receiving, from the first roaming hub in the first network, information identifying one or more further networks which can be reached via the first roaming hub and one or more further roaming hubs; and sending, to the network repository function in the second network, the information identifying one or more further networks which can be reached by the apparatus via the first roaming hub and the one or more further roaming hubs.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
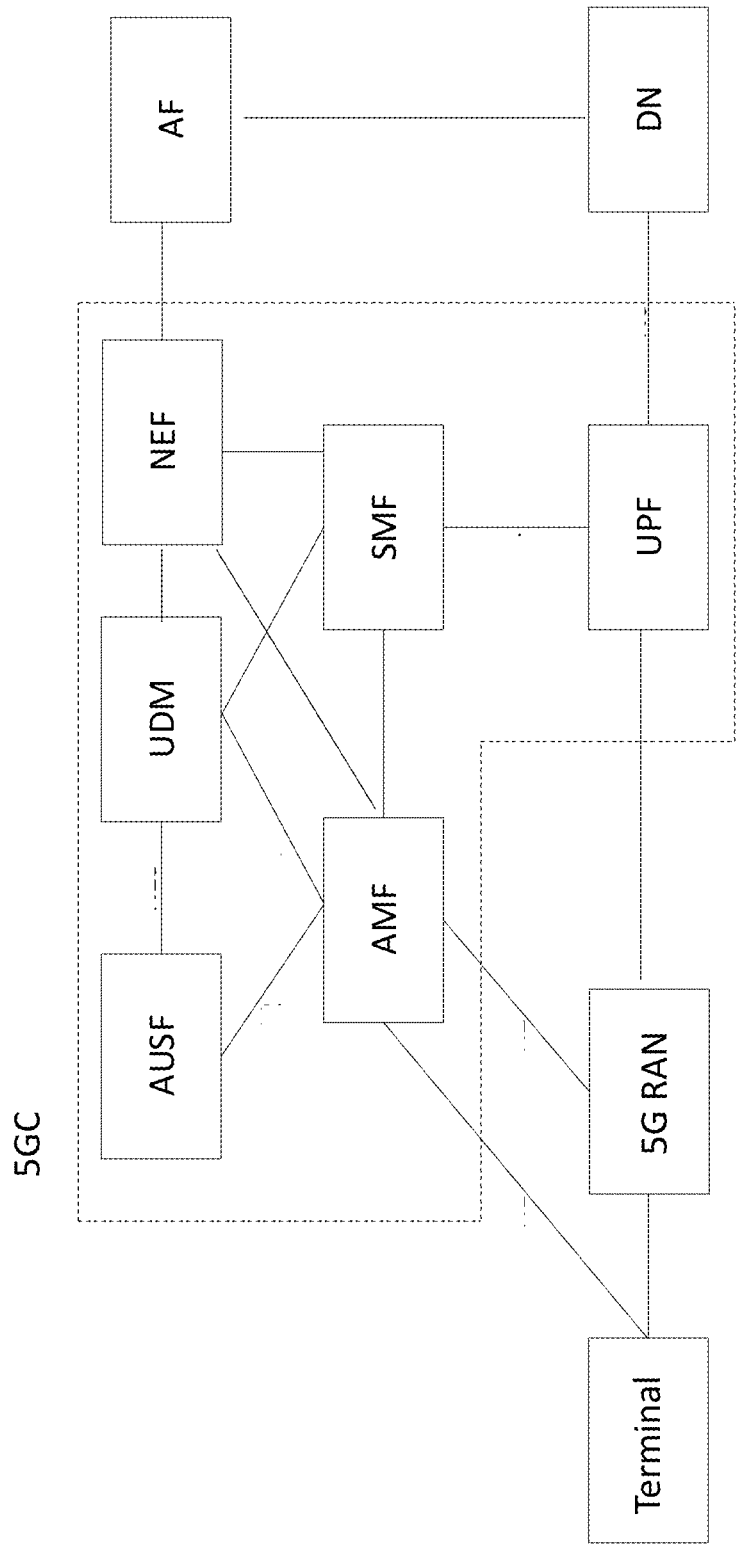
FIG. 1 shows a representation of a network system according to some example embodiments.

FIG. 1 shows a schematic representation of a 5G system (5GS). The 5GS may be comprised by a terminal or user equipment (UE), a 5G access network (5G AN) e.g. next generation radio access network (NG-RAN) or non 3GPP access network (N31WF, TNGF, W-AGF), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions. The 5GC may comprise the following entities: Network Slice Selection Function (NSSF); Network Exposure Function (NEF); Network Repository Function (NRF); Policy Control Function (PCF); Unified Data Management (UDM); Application Function (AF); Authentication Server Function (AUSF); an Access and Mobility Management Function (AMF); Session Management Function (SMF); and User Plane Function (UPF). The list above is not limiting.

Figure 2:
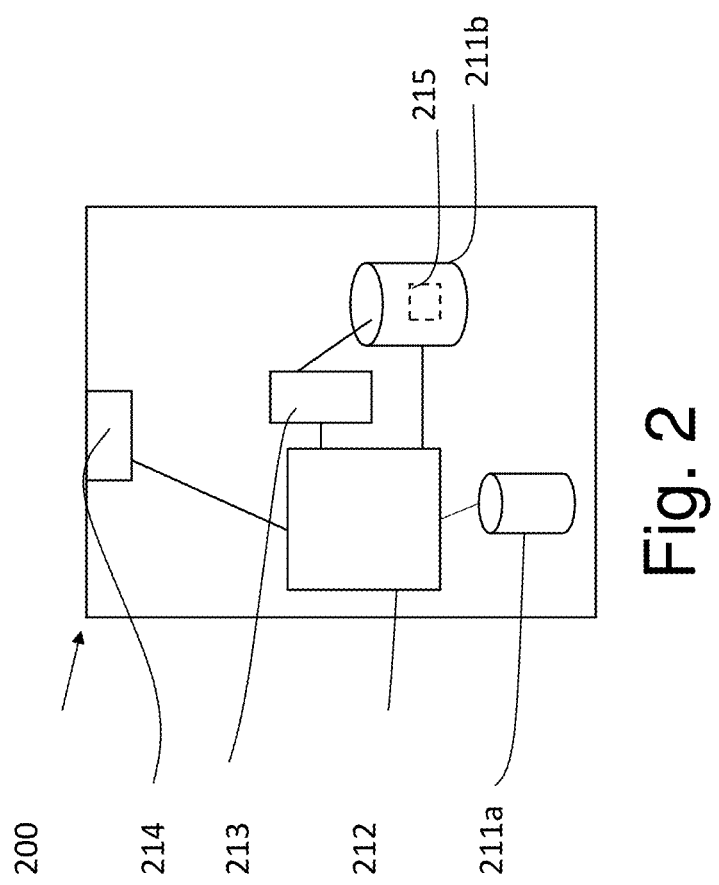
FIG. 2 shows a representation of a control apparatus according to some example embodiments.

FIG. 2 illustrates an example of a control apparatus 200 for controlling a function of the 5G-AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
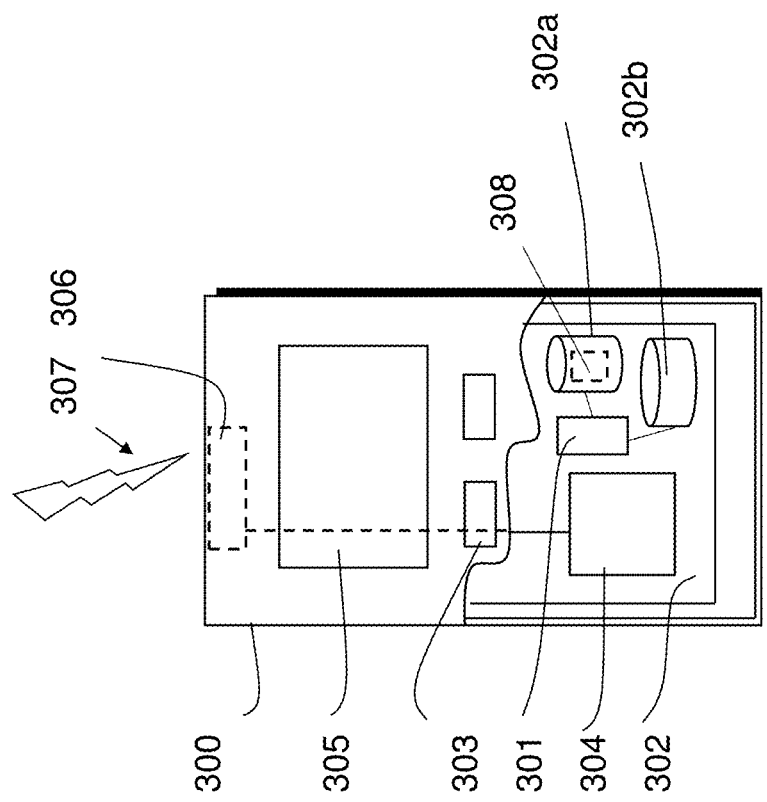
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In some networks, a Security Edge Protection Proxy (SEPP) may be implemented to protect control plane traffic that is exchanged between different PLMNs (Public Land Mobile Networks).

The SEPP may register, in a profile for the SEPP in the NRF, a list of remote PLMN Ids that are reachable via the SEPP. This information can be used by NFs or by SCPs (in the same PLMN as the SEPP) to discover and select the right SEPP through which inter-PLMN communications targeting a given remote PLMN should take place.

For example, TS 29.510 clause 6.1.6.2.72 defines an example information type (called Seppinfo therein) which may be used for the SEPP to register the list with the NRF. Table 1 below shows an example information type:

TABLE 1

| Attribute name | Data type | P | Cardinality | Description |
| --- | --- | --- | --- | --- |
| seppPorts | map(integer) | C | 1..N | |
| remotePlmnList | array(PlmnId) | O | 1..N | List of remote PLMNs reachable through the SEPP. The absence of this attribute indicates that any PLMN is reachable through the SEPP. |

Discussions are on-going regarding 5GC roaming models and the support of Roaming Hub (RHUB). A RHUB is a service which may allow different PLMN operators to offer international roaming coverage with a single connection and single roaming agreement.

As indicated in GSMA LS (C4-214739), a roaming hub is a commercial entity that can be contracted by a network operator to enable quick and efficient access to a wide range of roaming agreements. The roaming hub may have a number of roaming agreements and technical interconnections, which may already be fully negotiated and operational with other network operators when the contracting network operator "buys in" to these agreements (some or all of them). As negotiating roaming agreements with the full range of network operators in the world can take a substantial amount of time and resources, some contracting network operators use a roaming hub to get quick access to a wide roaming footprint. Roaming hubs are acting on behalf of the contracting operators from the commercial and technical point of view and have financial liability for roaming agreements enabled through them.

Figure 7:
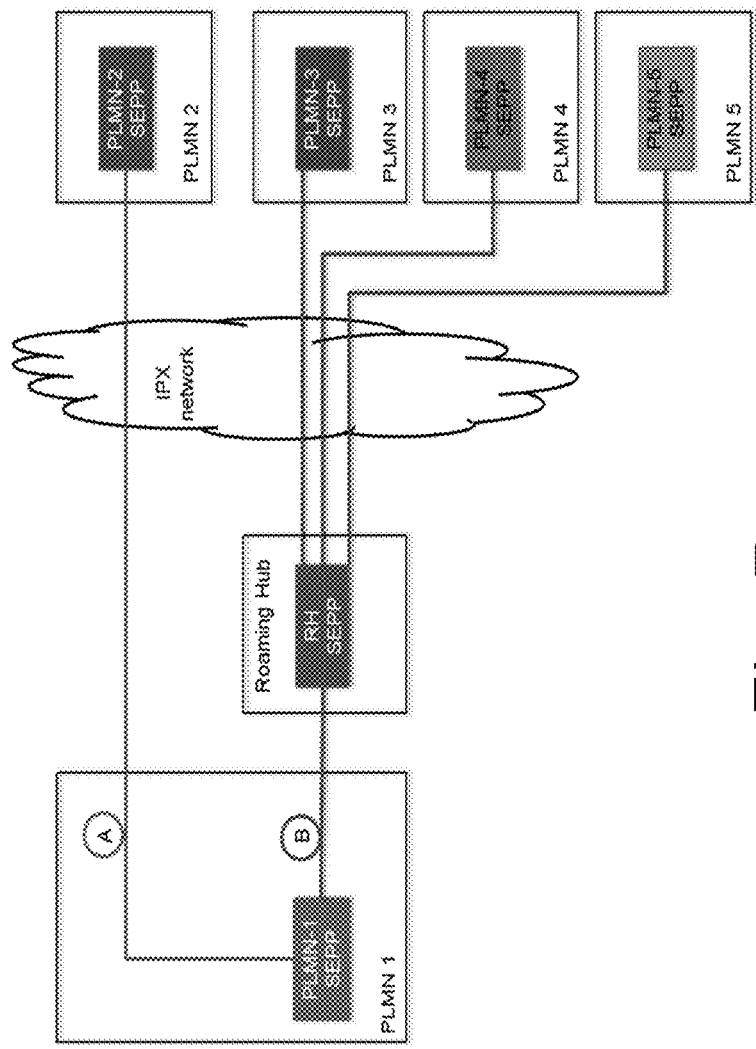
FIG. 7 shows an example implementation of a roaming hub.

FIG. 7 shows an example where PLMN 1 is using a Roaming Hub to get access to roaming footprint in PLMN 3, PLMN 4 and PLMN 5. The PLMN 1 SEPP in FIG. 7 may handle both bilateral N32 connection (A) and the Roaming Hub relation (B), however, in some examples, different SEPPs could be used for (A) and for (B), respectively. The RH SEPP in FIG. 7 handles the Roaming Hub relations with PLMN 1, 3, 4 and 5.

When roaming hubs are used, the commercial agreements may not be directly between the network operators, but may be between the roaming hub and the home and visited network operator.

Figure 4:
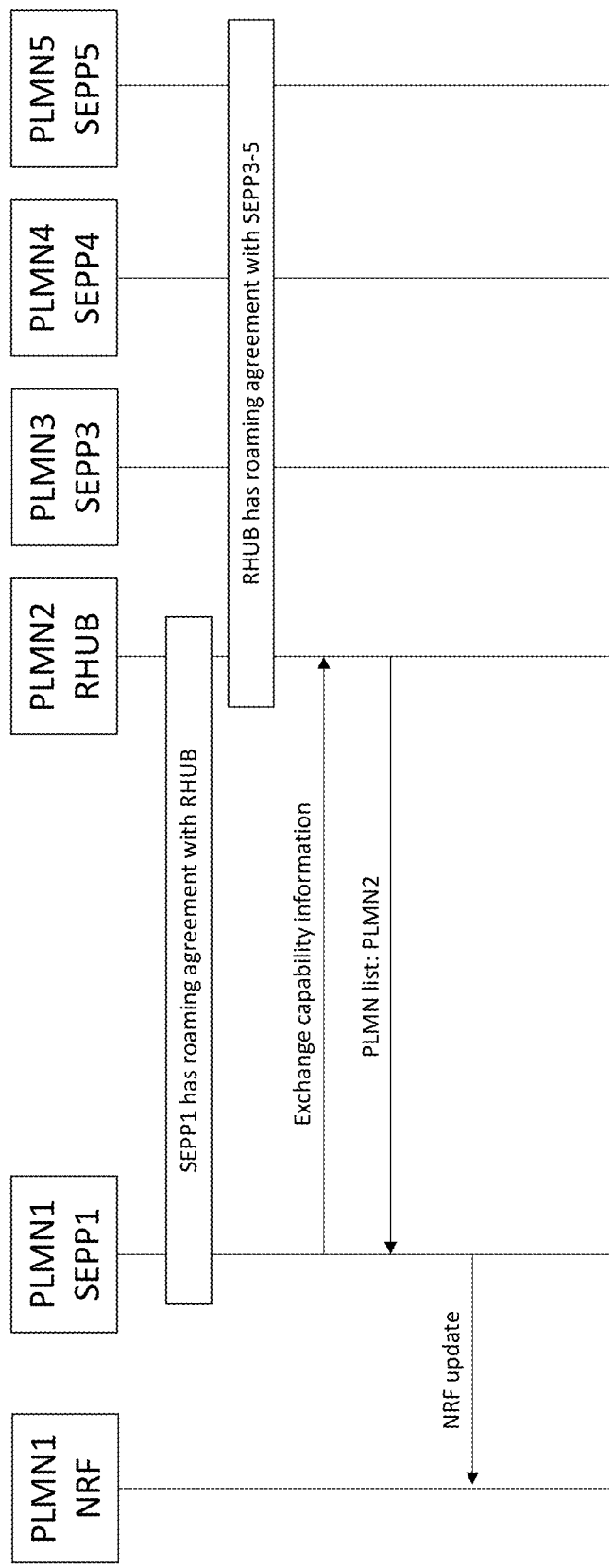
FIG. 4 shows an example signalling exchange with a roaming hub deployment.

Reference is made to FIG. 4, which shows an example signalling exchange with a RHUB deployment. In the example of FIG. 4, a PLMN operator may provide or support a NRF and PLMN ID PLMN1. While only one PLMN ID is depicted in FIG. 4, it should be understood that an operator may support or provide any number of PLMN IDs.

Each PLMN may comprise one or more SEPPs—e.g. PLMN1 may comprise SEPP1 and so on.

One or more remote PLMNs may also be provided by other operators. In the example of FIG. 4, this is depicted by PLMN2, PLMN3, PLMN4, and PLMN5. PLMNs 2-5 may be provided or supported by one or more other operators.

In the example of FIG. 4, PLMN2 comprises a RHUB. PLMN1 has a roaming agreement with the RHUB. The RHUB also has a roaming agreement with the SEPPs of PLMNs 3-5. SEPP1 of PLMN1 may exchange messages with the RHUB of PLMN2, and obtain information indicating that PLMN1 can reach PLMN2 via RHUB2. SEPP1 of PLMN1 may then update the NRF with this information. This may allow NFs within the operator's network to look-up information in the NRF to enable the NFs to access UEs or NFs in PLMN2 via the RHUB.

However, the information at the NRF may not indicate that PLMNs 3-5 are also accessible via the RHUB.

Considering that multiple remote PLMNs can be connected by a RHUB, or that multiple remote PLMNs may be hiding behind the RHUB, the SEPP of PLMN1 may not be able to discover the remote PLMN IDs reachable through a RHUB (with which the RHUB has a roaming agreement) and to update the NRF dynamically with the list of the remote PLMNs reachable then through the SEPPs connecting to this RHUB.

Therefore, a NF consumer (NFc) within a source PLMN, may not discover the right SEPP for the target PLMN, unless the SEPP is configured statically by the SEPP's PLMN operator with all the remote PLMN IDs reachable through the remote RHUB.

As a consequence, this may prevent roaming models with RHUBs whereby a PLMN has a roaming agreement with a RHUB only while this PLMN needs not to be aware of the remote PLMN IDs with which the RHUB has a roaming agreement.

Furthermore, even if the SEPP's PLMN operator has a roaming agreement with PLMNs accessible via the RHUB, this may require the SEPP's PLMN operator to configure its SEPPs with the list of the remote PLMN IDs reachable via a RHUB.

Statically configuring the SEPPs with the remote PLMNs list may have further drawbacks. For example, the SLA and the static configuration may need to be updated if the list of remote PLMN IDs reachable through the RHUB changes, which may be inefficient.

For example, with reference to FIG. 4, if a target SEPP (SEPP3) of a remote PLMN (PLMN3) is not available any more by a RHUB of a first PLMN (PLMN2), inter-PLMN communication from a second PLMN (PLMN1) towards the remote PLMN (PLMN3) via the RHUB of the first PLMN (PLMN2) may fail. This may result in signalling resources being wasted, as the source SEPP (SEPP1) may not be aware of the failure. This may also end up with mediation/charging issues because the second PLMN (PLMN1) is using the services of the first PLMN (PLMN2, and more particularly the RHUB of PLMN2) which will fail due to lack of communication between the first PLMN and the remote PLMN.

Additionally, the SEPP cannot discover the remote SEPPs or RHUBs from a remote PLMN or RHUB network. This may result in the SEPP's PLMN operator having to configure its SEPPs with all the remote SEPPs or RHUBs that may be available for inter-PLMN communication, and to maintain this configuration up to date—for example when a remote RHUB network or PLMN deploys new SEPPs or RHUBs or when existing remote SEPPs or RHUBs would be de-commissioned.

Referring again to the example FIG. 4, PLMNs 3, 4 and 5 are connected to SEPP1 of PLMN1 via RHUB located in PLMN2. SEPP1 may not be informed about PLMNs 3, 4, 5. If the RHUB is able to reach PLMN7, or stops being able to reach PLMN 7 (for example, the network of the RHUB has a new roaming agreement with PLMN 7 or ceases to have a roaming agreement with PLMN 7), the RHUB cannot update the SEPP1 of PLMN1 of this change. That is to say, SEPP1 of PLMN1 cannot discover dynamically all the RHUBs available from the PLMN2 and the list of PLMNs each of these RHUBs enable to reach.

Thus a procedure to discover remote SEPPs and RHUBs with the remote PLMNs they are allowed to reach would be beneficial.

Figure 8:
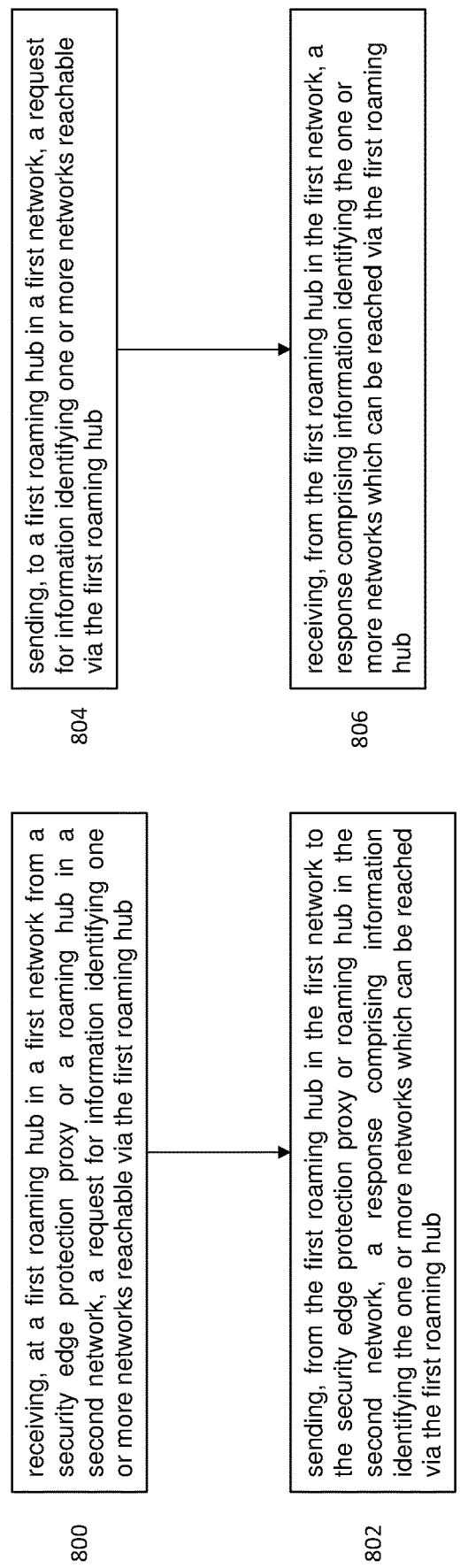
FIGS. 8a and 8b show methods according to some examples.

Reference is made to FIG. 8, which shows a method according to some examples.

As shown in FIG. 8a, at step 800, the method may comprise receiving, at a first roaming hub in a first network from a security edge protection proxy or a roaming hub in a second network, a request for information identifying one or more networks reachable via the first roaming hub.

At step 802, the method may comprise sending, from the first roaming hub in the first network to the security edge protection proxy or roaming hub in the second network, a response comprising information identifying the one or more networks which can be reached via the first roaming hub.

As shown in FIG. 8b, at step 804 the method may comprise sending, to a first roaming hub in a first network, a request for information identifying one or more networks reachable via the first roaming hub.

At step 806, the method may comprise receiving, from the first roaming hub in the first network, a response comprising information identifying the one or more networks which can be reached via the first roaming hub.

Thus, some examples may enable a SEPP to discover a list of remote PLMNs that can be accessed through a RHUB. The SEPP may dynamically update the NRF with such information, such as to allow the SEPP to be discovered and selected by NF or SCP for inter-PLMN communication targeting a remote PLMN sitting behind the RHUB.

Figure 9:
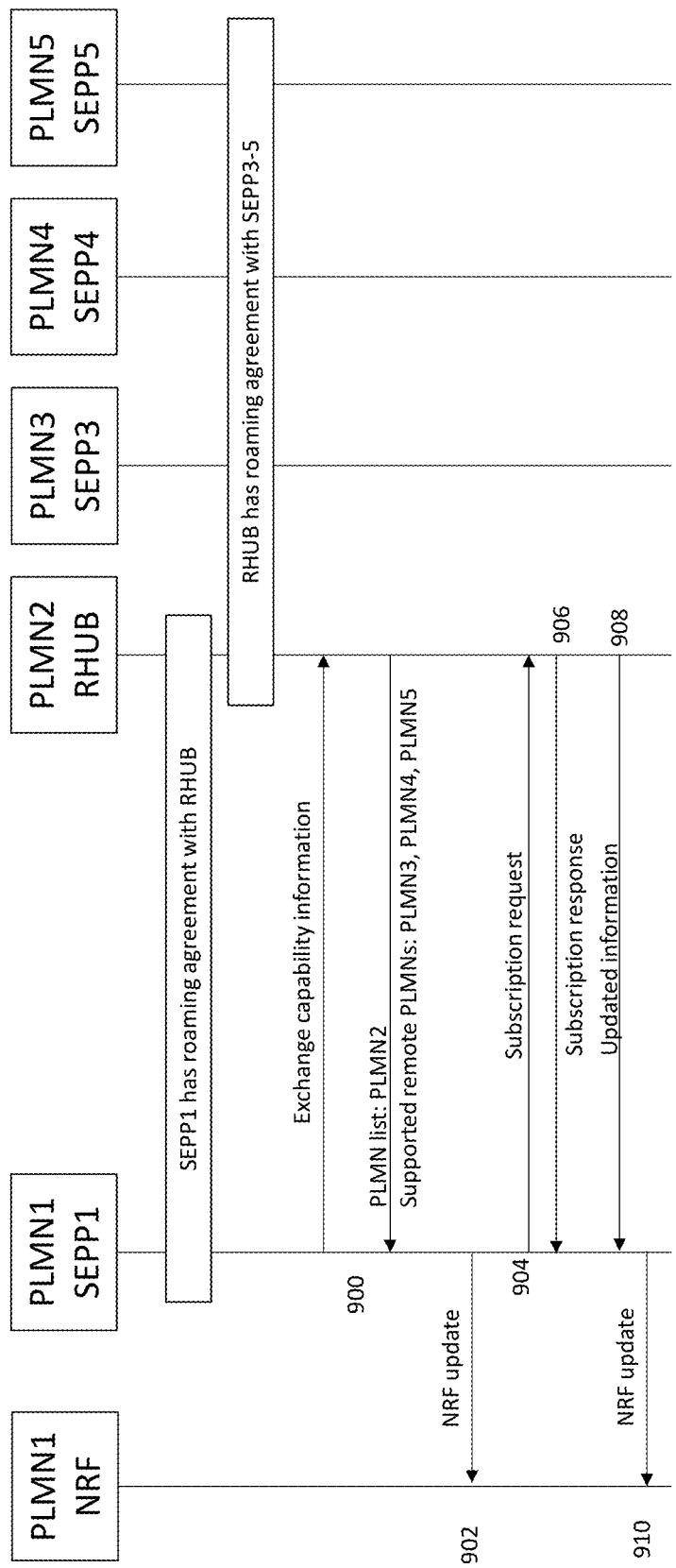
FIG. 9 shows a signalling exchange according to some examples.

Reference is made to FIG. 9, which shows a signalling exchange according to some examples.

In the example of FIG. 9, an PLMN operator may provide or support a NRF and PLMN1. While only one PLMN IDs is depicted in FIG. 9, it should be understood that an operator may support or provide any number of PLMN IDs.

Each PLMN may comprise one or more SEPPs—e.g., PLMN1 may comprise a SEPP1, and so on.

One or more remote PLMNs may also be provided by other operators. In the example of FIG. 9, this is depicted by PLMN2, PLMN3, PLMN4, and PLMN5. PLMNs 2-5 may be provided or supported by one or more other operators.

In the example of FIG. 9, the second network (PLMN2) comprises a RHUB. The first network (PLMN1) has a roaming agreement with the RHUB. The RHUB also has a roaming agreement with the SEPPs of PLMNs 3-5.

At 900, the SEPP of the first network may send a request message to the RHUB of the second network. The request may be for information indicating one or more PLMNs that can be reached through the RHUB.

In some examples, the request message may comprise a GET request or a SUBSCRIBE request. The SUBSCRIBE request may request an immediate response.

In response, the RHUB of the second network may send a message including information indicating that the first network can reach the second network and one or more remote PLMNs via the RHUB of the second network. In the example of FIG. 9, the response indicates that the first network can reach PLMNs 3-5 via RHUB2.

In some examples, the response from the RHUB may include a SupportedRemotePLMNIDList information element. The SupportedRemotePLMNIDList information element may indicate the one or more remote PLMNs reachable via the RHUB. The request and response may comprise a N32-C exchange-capability message.

At 902, the SEPP of the first network updates the NRF of the first network with the received information.

In some examples, the RHUB may determine updated information relating to the one or more remote networks reachable through the RHUB, and update the SEPP of the first network accordingly.

For example, the RHUB of the second network may receive a new PLMN ID (for example PLMN7) from a remote network SEPP. In response, the RHUB may update the SEPP of the first network. For example, the RHUB may trigger the N32-C exchange-capability message request towards the first network to update the remote PLMN IDs.

In some examples, the RHUB may receive a SupportedRemotePLMNIDList from one or more remote RHUBs. The RHUB may thus consider the PLMNs available in the SupportedRemotePLMNIDList reachable via the RHUB. The RHUB may then update the first network with the updated PLMN information. For example, the RHUB may trigger the N32-C exchange-capability message request towards the first network to update the remote PLMN IDs.

In some examples, the RHUB maintains the PLMN ID list reachable directly or via other RHUBs and keep on updating the same to the peer SEPPs.

In some examples the SEPP of the first network may send a subscription request to the RHUB of the second network, as shown in 904. The subscription request may be to receive notifications about changes of the remote PLMN IDs accessible to the first network via RHUB2.

In response, the RHUB of the second network may send a subscription response indicating that the subscription has been applied. This is shown at step 906 in FIG. 9.

The subscription may mean that, when the RHUB of the second network updates the list of remote PLMNs reachable via the RHUB (such as in the case of any of the examples discussed previously), the RHUB of the second network is configured to send the updated information to the SEPP of the first network, as shown by step 908.

For example, the RHUB may update the list to indicate that a new network may be reached via the roaming hub, and/or that there has been a change in information associated with one or more of the networks reachable via the roaming hub, and/or that a network that was previously reachable via the roaming hub is no longer reachable via the roaming hub.

The SEPP of the first network may then update the NRF of the first network with the updated information, as shown by step 910.

Thus, in some examples, whenever SEPP receives updated remote PLMN information (for example via a N32-C exchange-capability message with new PLMN ID in the SupportedRemotePLMNIDList), the SEPP may update the NRF with the updated remote PLMN information, so that the SEPP can be selected for the corresponding remote PLMNs.

Additionally, in some examples the SEPP of the first network may be configured with the list of PLMNs with which a roaming agreement exists. If so, then SEPP may register in its profile in NRF the remote PLMNs advertised by the RHUB with which a roaming agreement exists.

In some examples, there is provided an apparatus comprising means for: receiving, at a first roaming hub in a first network from a security edge protection proxy or a roaming hub in a second network, a request for information identifying one or more networks reachable via the first roaming hub; and sending, from the first roaming hub in the first network to the security edge protection proxy or roaming hub in the second network, a response comprising information identifying the one or more networks which can be reached via the first roaming hub.

In some examples, the apparatus may comprise at least one processor and at least one memory including a computer program code, the at least one memory and computer program code configured to, with the at least one processor, cause the apparatus at least to: receive, at a first roaming hub in a first network from a security edge protection proxy or a roaming hub in a second network, a request for information identifying one or more networks reachable via the first roaming hub; and send, from the first roaming hub in the first network to the security edge protection proxy or roaming hub in the second network, a response comprising information identifying the one or more networks which can be reached via the first roaming hub.

In some examples, there is provided an apparatus comprising means for: sending, to a first roaming hub in a first network, a request for information identifying one or more networks reachable via the first roaming hub; and receiving, from the first roaming hub in the first network, a response comprising information identifying the one or more networks which can be reached via the first roaming hub.

In some examples, the apparatus may comprise at least one processor and at least one memory including a computer program code, the at least one memory and computer program code configured to, with the at least one processor, cause the apparatus at least to: send, to a first roaming hub in a first network, a request for information identifying one or more networks reachable via the first roaming hub; and receive, from the first roaming hub in the first network, a response comprising information identifying the one or more networks which can be reached via the first roaming hub.

Figure 5:
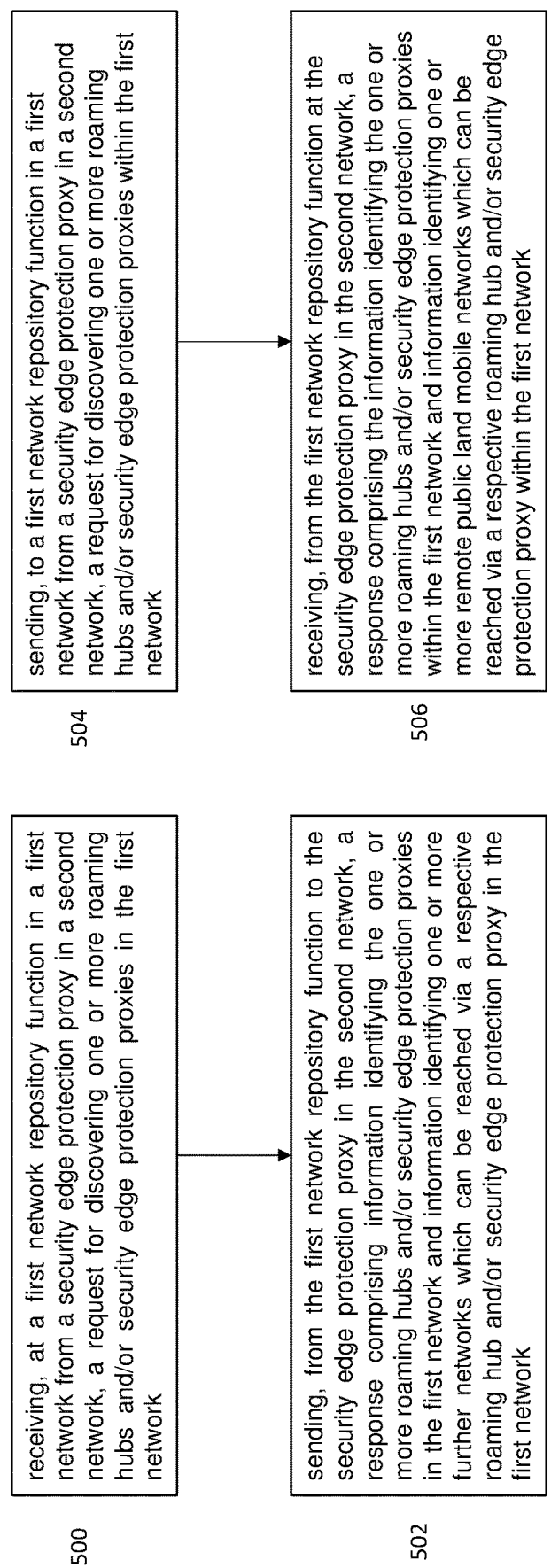
FIGS. 5a and 5b show methods according to some examples.

Reference is made to FIG. 5, which shows a method according to some examples.

As shown in FIG. 5a, at step 500 the method may comprise receiving, at a first network repository function in a first network from a security edge protection proxy in a second network, a request for discovering one or more roaming hubs and/or security edge protection proxies in the first network.

At step 502, the method may comprise sending, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

As shown in FIG. 5b, at step 504, the method may comprise sending, to a first network repository function in a first network from a security edge protection proxy in a second network, a request for discovering one or more roaming hubs and/or security edge protection proxies within the first network.

At step 506, the method may comprise receiving, from the first network repository function at the security edge protection proxy in the second network, a response comprising the information identifying the one or more roaming hubs and/or security edge protection proxies within the first network and information identifying one or more remote public land mobile networks which can be reached via a respective roaming hub and/or security edge protection proxy within the first network.

Thus, some examples may enable a SEPP to discover remote SEPPs or RHUBs from a remote PLMN or RHUB network, together with the list of remote PLMNs they allow to reach. This may enable the SEPP to setup one or more connections, such as N32 connections, towards the remote SEPPs or RHUBs available at any time in the remote PLMN or RHUB network.

Figure 6:
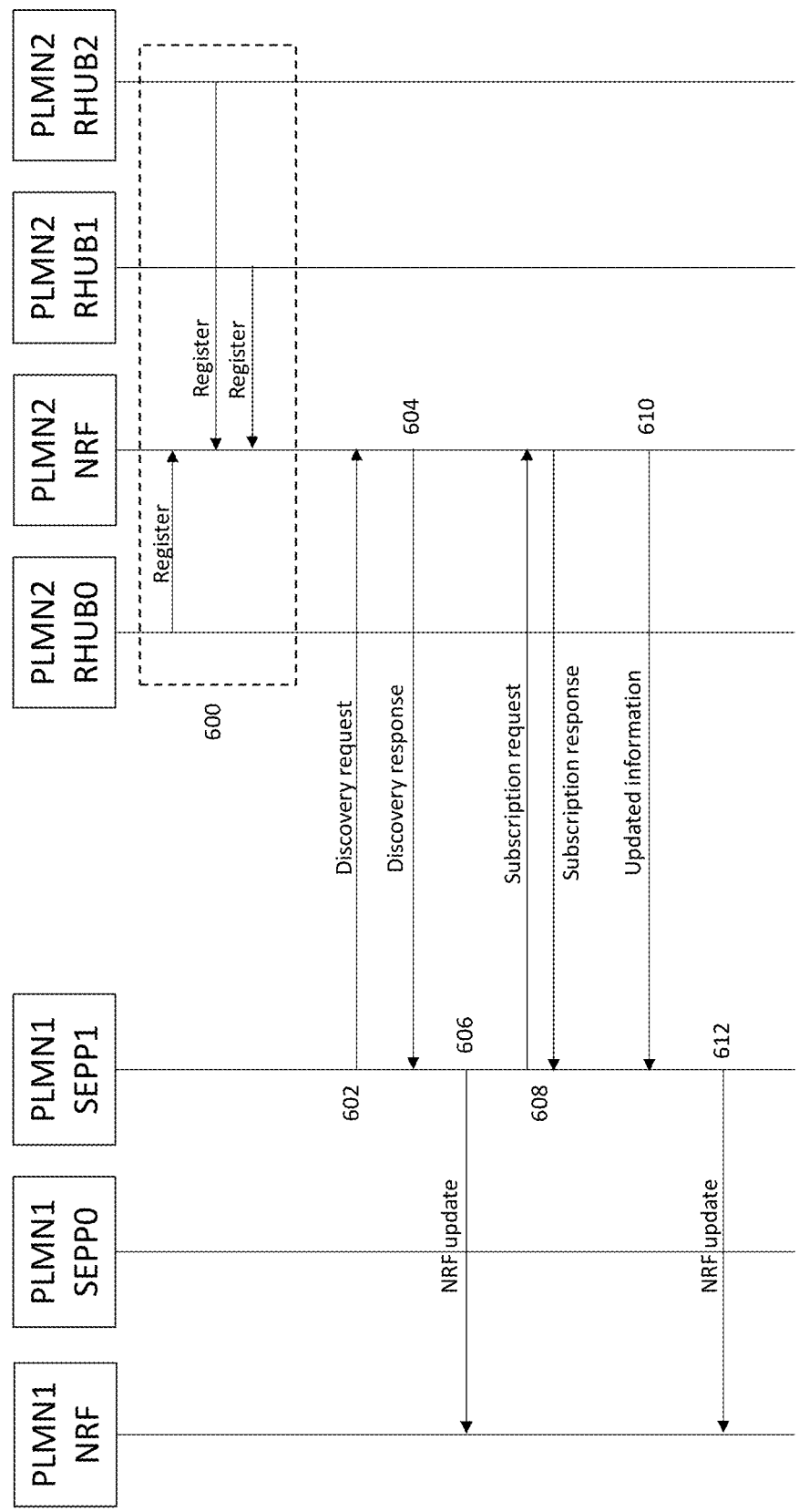
FIG. 6 shows a signalling exchange according to some examples.

Reference is made to FIG. 6, which shows a signalling exchange according to some examples.

In the example of FIG. 6, at step 600, one or more RHUBs and/or SEPPs in a second network registers its profile in the NRF of the second network with the list of remote PLMNs it can reach. The profile may comprise, for a given RHUB and/or SEPP in the second network, information identifying one or more PLMNs which can be reached via the given RHUB and/or SEPP in the second network.

The second network may for example be a PLMN, which may contain a RHUB.

In the example of FIG. 6, step 600 results in RHUB0 of PLMN2, RHUB1 of PLMN2, and RHUB2 of PLMN2 registering their profiles with NRF of PLMN2.

In some examples, the registration may be performed by sending a registration message to the NRF. For example, the registration message may be a Nnrf_NFManagement_NFRegister message.

At step 602, a SEPP of a first network sends a request to the NRF of the second network for retrieving information relating to one or more RHUBs and/or SEPPs in the second network. The request may for example be a discovery request. In the example of FIG. 6, SEPP1 of PLMN1 sends a discovery request to the NRF of PLMN2.

The request may be sent through a N32-f connection (for example if at least one remote SEPP or RHUB is configured locally in SEPP1) or outside of any N32-c/N32-f connection (for example when no N32-c connection exists due to remote SEPP being unknown).

At step 604, in response to receiving the discovery request, the NRF of the second network sends a discovery response to the SEPP of the first network.

The discovery response may comprise information identifying one or more RHUBs and/or SEPPs in the second network. The discovery response may also comprise the profile information for the SEPPs and/or RHUBs in the second network. Thus, in some examples, the discovery response may comprise the information identifying one or more PLMNs which can be reached via a respective RHUB and/or SEPP in the second network.

At step 606, based on the received information, the SEPP of the first network may update the NRF of the first network with one or more PLMN IDs which can be reached via a given RHUB and/or SEPP in the second network.

In some examples, the SEPP of the first network may subscribe to NF status change of SEPPs/RHUB(s) from the second network. The SEPP of the first network may send a subscription request to the NRF of the second network. In response, the NRF of the second network may send a subscription response indicating that the subscription has been applied. This is shown at step 608 in FIG. 6.

For example, the SEPP of the first network may for example send a Nnrf_NFManagement_NFStatusSubscribe message to the NRF of the second network.

The subscription may mean that, when the SEPPs and/or RHUBs of the second network update their respective profile information stored at the NRF of the second network and/or deregister, the NRF of the second network is configured to send the updated information to the SEPP of the first network, as shown by step 610.

The SEPP of the first network may then update the NRF of the first network with the updated information, as shown by step 612.

Thus, each SEPP may be configured with the URI of a (default) RHUB and/or SEPP of the second network. A NF discovery request can then be sent, for example on the corresponding N32-f connection, to retrieve all RHUBs/SEPPs of the second network, with the necessary information of the different RHUB/SEPP profiles to be exposed to remote PLMNs.

Information identifying one or more SEPPs and/or RHUBs may be returned in a discovery response. In some examples, the information identifying the one or more SEPPs and/or RHUBs may include a priority parameter. In some examples the priority parameter may be based on the requesting SEPP's PLMN. The priority parameter may be used to give preference to certain SEPPs and/or RHUBs for subsequent inter-PLMN communications with the second PLMN.

In some examples, there is provided an apparatus comprising means for: receiving, at a first network repository function in a first network from a security edge protection proxy in a second network, a request for discovering one or more roaming hubs and/or security edge protection proxies in the first network; and sending, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

In some examples, the apparatus may comprise at least one processor and at least one memory including a computer program code, the at least one memory and computer program code configured to, with the at least one processor, cause the apparatus at least to: receive, at a first network repository function in a first network from a security edge protection proxy in a second network, a request for discovering one or more roaming hubs and/or security edge protection proxies in the first network; and send, from the first network repository function to the security edge protection proxy in the second network, a response comprising information identifying the one or more roaming hubs and/or security edge protection proxies in the first network and information identifying one or more further networks which can be reached via a respective roaming hub and/or security edge protection proxy in the first network.

In some examples, there is provided an apparatus comprising means for: sending, to a first network repository function in a first network from a security edge protection proxy in a second network, a request for discovering one or more roaming hubs and/or security edge protection proxies within the first network; and receiving, from the first network repository function at the security edge protection proxy in the second network, a response comprising the information identifying the one or more roaming hubs and/or security edge protection proxies within the first network and information identifying one or more remote public land mobile networks which can be reached via a respective roaming hub and/or security edge protection proxy within the first network.

In some examples, the apparatus may comprise at least one processor and at least one memory including a computer program code, the at least one memory and computer program code configured to, with the at least one processor, cause the apparatus at least to: send, to a first network repository function in a first network from a security edge protection proxy in a second network, a request for discovering one or more roaming hubs and/or security edge protection proxies within the first network; and receive, from the first network repository function at the security edge protection proxy in the second network, a response comprising the information identifying the one or more roaming hubs and/or security edge protection proxies within the first network and information identifying one or more remote public land mobile networks which can be reached via a respective roaming hub and/or security edge protection proxy within the first network.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory including instructions of a first network repository function that, when executed by the at least one processor, cause the apparatus at least to:
   receive, at the first network repository function in a first network from a security edge protection proxy in a second network, a request for discovering one or more roaming hubs in the first network; and
   send, from the first network repository function to the security edge protection proxy in the second network, a response comprising information identifying the one or more roaming hubs in the first network and information identifying one or more further networks which can be reached via a respective roaming hub of the one or more roaming hubs in the first network.

2. The apparatus of claim 1, wherein the instructions, when executed by the at least one processor, further cause the apparatus at least to:
   receive, at the first network repository function from the one or more roaming hubs in the first network, at least one of the following: the information identifying the one or more further networks, or addressing information for contacting the one or more roaming hubs in the first network.

3. The apparatus of claim 1, wherein the request for discovering the one or more roaming hubs comprises a subscription request.

4. The apparatus of claim 3, wherein the instructions, when executed by the at least one processor, further cause the apparatus at least to:
   determine at least one of the following: updated information identifying the one or more further networks which can be reached via a roaming hub of the one or more roaming hubs within the first network, or updated addressing information for contacting the one or more roaming hubs in the first network; and
   send, to the security edge protection proxy in the second network, corresponding at least one of the updated information, or the updated addressing information.

5. The apparatus of claim 4, wherein the information identifying the one or more further networks further comprises information related to related to at least one of:
   a new roaming hub in the first network,
   roaming hub that is removed from the first network, or
   a modified roaming hub in the first network.

6. The apparatus of claim 1, wherein the information identifying the one or more further networks further comprises a respective priority parameter associated with the respective roaming hub within the first network.

7. An apparatus comprising at least one processor and at least one memory including instructions of a security edge protection proxy that, when executed by the at least one processor, cause the apparatus at least to:
   send, to a first network repository function in a first network from the security edge protection proxy in a second network, a request for discovering one or more roaming hubs within the first network; and
   receive, from the first network repository function at the security edge protection proxy in the second network, a response comprising the information identifying the one or more roaming hubs within the first network and information identifying one or more further networks which can be reached via a respective roaming hub of the one or more roaming hubs within the first network.

8. The apparatus of claim 7, wherein the instructions, when executed by the at least one processor, further cause the apparatus at least to:
   send, to a second network repository function in the second network, at least one of the following: the information identifying the one or more further networks which can be reached via a respective roaming hub of the one or more roaming hubs within the first network via the apparatus, or addressing information for contacting the one or more roaming hubs in the first network.

9. The apparatus of claim 7, wherein the request for discovering the one or more roaming hubs comprises a subscription request.

10. The apparatus of claim 9, wherein instructions, when executed by the at least one processor, further cause the apparatus at least to:
   receive, at the security edge protection proxy in the second network from the first network repository function, at least one of the following: updated information identifying the one or more further networks which can be reached via a roaming hub of the one or more roaming hubs within the first network, or updated addressing information for contacting the one or more roaming hubs in the first network.

11. The apparatus of claim 10, wherein the instructions, when executed by the at least one processor, further cause the apparatus at least to:
    send, to a second network repository function in the second network, the updated information identifying the one or more further networks which can be reached via the roaming hub within the first network.

12. The apparatus of claim 7 wherein the information identifying the one or more further networks comprises a respective priority parameter associated with the respective roaming hub within the first network.

13. An apparatus comprising at least one processor and at least one memory including instructions of a first roaming hub that, when executed by the at least one processor, cause the apparatus at least to:
    receive, at the first roaming hub in a first network from a roaming hub in a second network, a request for information identifying one or more networks reachable via the first roaming hub; and
    send, from the first roaming hub in the first network to the roaming hub in the second network, a response comprising information identifying the one or more networks which can be reached via the first roaming hub.

14. The apparatus of claim 13, wherein at least one of the request or the response comprise a N32-C exchange-capability message.

15. The apparatus of claim 14, wherein the instructions, when executed by the at least one processor, further cause the apparatus at least to:
    determine, at the first roaming hub, updated information identifying the one or more networks which can be reached via the first roaming hub; and
    send, to the roaming hub in the second network, the updated information.

16. The apparatus of claim 15, wherein the updated information comprises information identifying one or more of:
    a new network which can be reached via the first roaming hub;
    a change in information associated with one or more of the one or more networks; and
    that one of the one or more networks is no longer reachable via the first roaming hub.

17. The apparatus of claim 13, wherein the instructions, when executed by the at least one processor, further cause the apparatus at least to:
    receive, from the roaming hub in the second network, a subscription request for the updated information identifying the one or more networks which can be reached via the first roaming hub,
    send the updated information based on the the subscription request.

18. The apparatus of claim 13, wherein the instructions, when executed by the at least one processor, further cause the apparatus at least to:
    receive, from one or more further roaming hubs in one or more remote networks, information indication one or more further networks that may be reached via the one or more remote roaming hubs; and
    send, to a security edge protection proxy in the second network, information identifying the one or more further networks which can be reached via the first roaming hub and the one or more remote roaming hubs.

19. An apparatus comprising at least one processor and at least one memory including instructions that, when executed by the at least one processor, cause the apparatus at least to:
    send, to a first roaming hub in a first network, a request for information identifying one or more networks reachable via the first roaming hub; and
    receive, from the first roaming hub in the first network, a response comprising information identifying the one or more networks which can be reached via the first roaming hub.

20. The apparatus of claim 19, wherein the instructions, when executed by the at least one processor, further cause the apparatus at least to:
    send, to a network repository function in a second network, the information identifying the one or more networks which can be reached via the first roaming hub within the first network via the apparatus.

21. The apparatus of claim 20, wherein the instructions, when executed by the at least one processor, further cause the apparatus at least to:
    receive, from the first roaming hub in the first network, information identifying one or more further networks which can be reached via the first roaming hub and one or more further roaming hubs; and
    send, to the network repository function in the second network, the information identifying the one or more further networks which can be reached by the apparatus via the first roaming hub and the one or more further roaming hubs.

22. The apparatus of claim 19, wherein the instructions, when executed by the at least one processor, further cause the apparatus at least to:
    receive, from the first roaming hub, updated information identifying the one or more networks which can be reached via the first roaming hub; and
    send, to a network repository function in the second network, the updated information identifying the one or more networks which can be reached via the first roaming hub via the apparatus.

23. The apparatus of claim 22, wherein the instructions, when executed by the at least one processor, further cause the apparatus at least to:
    send, to a security edge protection proxy or roaming hub in the second network, a subscription request for the updated information; and
    receive the updated information based on the subscription request.

* * * * *